US008379360B2

(12) United States Patent
Murota

(10) Patent No.: US 8,379,360 B2
(45) Date of Patent: Feb. 19, 2013

(54) OVERCURRENT PROTECTION CIRCUIT AND IN-VEHICLE DISPLAY DEVICE

(75) Inventor: Kazuaki Murota, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 192 days.

(21) Appl. No.: 12/892,103

(22) Filed: Sep. 28, 2010

(65) Prior Publication Data

US 2011/0075307 A1 Mar. 31, 2011

(30) Foreign Application Priority Data

Sep. 30, 2009 (JP) ................................ 2009-228214

(51) Int. Cl.
*H02H 9/02* (2006.01)

(52) U.S. Cl. ...................................................... 361/93.7

(58) Field of Classification Search .................. 361/93.7
See application file for complete search history.

(56) References Cited

U.S. PATENT DOCUMENTS 3,703,679 A * 11/1972 Heidt ........................... 323/278
4,017,789 A * 4/1977 Morris .......................... 323/285
4,644,247 A * 2/1987 Burmenko .................... 320/138
4,972,136 A * 11/1990 Banura ......................... 323/275
5,548,467 A * 8/1996 Heaney et al. ............... 361/93.7
5,821,697 A * 10/1998 Weber ....................... 315/200 A
7,199,562 B2 * 4/2007 Muterspaugh ................ 323/235

FOREIGN PATENT DOCUMENTS

JP S63-138833 9/1988
JP S63-77315 4/1998
JP A-2000-175345 6/2000

OTHER PUBLICATIONS

Nov. 1, 2012 Office Action issued in Japanese Patent Application No. 2009-228214 (with partial English translation).

* cited by examiner

*Primary Examiner* — Ronald W Leja
(74) *Attorney, Agent, or Firm* — Oliff & Berridge, PLC

(57) ABSTRACT

An overcurrent protection circuit is provided. An overcurrent detecting element is connected between a power source and a load and detects an overcurrent flowing through the load. A main switch element is connected between the load and the overcurrent detecting element and controls flow of current to the load according to a voltage applied between a control end and an input end of the main switch element. The main switch element stops the flow of current to the load when a predetermined time is elapsed after the overcurrent detecting element detects the overcurrent flowing through the load. A first switch element has an output end connected to the control end of the main switch element. A current flows to the first switch when the overcurrent detecting element detects the overcurrent flowing through the load.

6 Claims, 8 Drawing Sheets

OVERCURRENT PROTECTION CIRCUIT AND IN-VEHICLE DISPLAY DEVICE

The disclosure of Japanese Patent Application No. 2009-228214 filed on Sep. 30, 2009, including specification, drawings and claims is incorporated herein by reference in its entirety.

BACKGROUND

The present invention relates to an overcurrent protection circuit which stops the flow of a current to a load at the time of overcurrent detection without an erroneous operation caused by an inrush current and the like.

FIG. 1 is a view showing an overcurrent protection circuit in the related art. Rs is a load current detection resistor, and Qm is a P-channel MOS field effect transistor. These are connected in series to a power source B and a load RL. A first transistor Q10 switches between ON and OFF states depending on a voltage drop which occurs at both ends of the load current detection resistor Rs according to a load current, which is a current supplied to the load.

When the power source B is turned on, the voltage of the power source B is divided by resistors R100 and R110, and a predetermined voltage is applied to a control end of the main transistor Qm. If a voltage is applied to the control end of the main transistor Qm, the main transistor Qm is turned on so that a necessary current is supplied to the load RL.

Since the load resistance is reduced if a ground fault occurs in a load-side circuit, excessive current flows through both the load current detection resistor Rs and the main transistor Qm. If this overcurrent exceeds the allowable amount of current of the device, the load current detection resistor Rs and the main transistor Qm break down.

When an overcurrent flows, a result of the voltage drop in the load current detection resistor Rs reaches an overcurrent detection voltage set beforehand and the first transistor Q10 is turned on accordingly. Through the turning ON of the first transistor Q10, a current flows through resistors R10 and R20. Then, a bias voltage is applied between the control and output ends of a second transistor Q20 to turn on the second transistor Q20. In addition, a current flows through resistors R40 and R50 through the turning on of the second transistor Q20. Then, a bias voltage is applied between the control and input ends of a third transistor Q30 to turn on the third transistor Q30. Moreover, through the turning on of the third transistor Q30, a potential difference between the input and control ends of the main transistor Qm is reduced to turn off the main transistor Qm. Thus, the overcurrent protection circuit in the related art is configured such that when the occurrence of an overcurrent is detected, the flow of the overcurrent is stopped by the turning OFF of the main transistor Qm.

In addition, a rising time of the voltage applied to the control end of the second transistor Q20 is delayed by the time constant of an integrating circuit which is formed by a resistor R30 and a capacitor C10. For this reason, even when an instantaneous overcurrent is generated due to an inrush current at the start of operation or the input of noise from the outside, the second transistor Q20 is not turned on immediately. Thus, the overcurrent protection circuit in the related art is configured such that the flow of current is not stopped due to erroneously detecting an inrush current at the start of operation or the like as a ground fault (see, JP-A-2000-175345).

However, the overcurrent protection circuit in the related art has the following problems.

If an overcurrent is detected, the overcurrent protection circuit stops the flow of the overcurrent in a set time, which is specified by the time constant of the capacitor C10. However, since the flow of the overcurrent continues during the set time, there is a possibility that the load current detection resistor Rs and the main transistor Qm connected to the load will break down during the time.

For this reason, expensive components, for which the allowable amount of current is high and are capable of withstanding an overcurrent over the set time, should be used for both of the elements. Accordingly, there is a problem that the cost of the overcurrent protection circuit increases.

SUMMARY

It is therefore an object of at least one embodiment of the present invention to prevent a breakdown caused by an overcurrent and also to reduce the cost of an overcurrent protection circuit by allowing the use of less expensive components for which the allowable amount of current is low.

In order to achieve at least one of the above-described objects, according to an aspect of the embodiments of the present invention, there is provided an overcurrent protection circuit comprising: an overcurrent detecting element which is connected between a power source and a load and which detects an overcurrent flowing through the load; a main switch element which is connected between the load and the overcurrent detecting element and which controls flow of current to the load according to a voltage applied between a control end and an input end of the main switch element, wherein the main switch element stops the flow of current to the load when a predetermined time is elapsed after the overcurrent detecting element detects the overcurrent flowing through the load; and a first switch element which has an output end connected to the control end of the main switch element and to which a current flows when the overcurrent detecting element detects the overcurrent flowing through the load.

With this configuration, even when an instantaneous overcurrent is generated due to an inrush current at the start of operation or the input of noise from the outside, the overcurrent protection circuit does not erroneously detect it as a ground fault. In addition, since an inexepensive component for which the allowable amount of current is low can be used, the cost of the overcurrent protection circuit can be reduced.

DETAILED DESCRIPTION OF THE EMBODIMENTS

Hereinafter, various embodiments of the present invention will be described in detail with reference to the accompanying drawings.

First Embodiment

Figure 1:
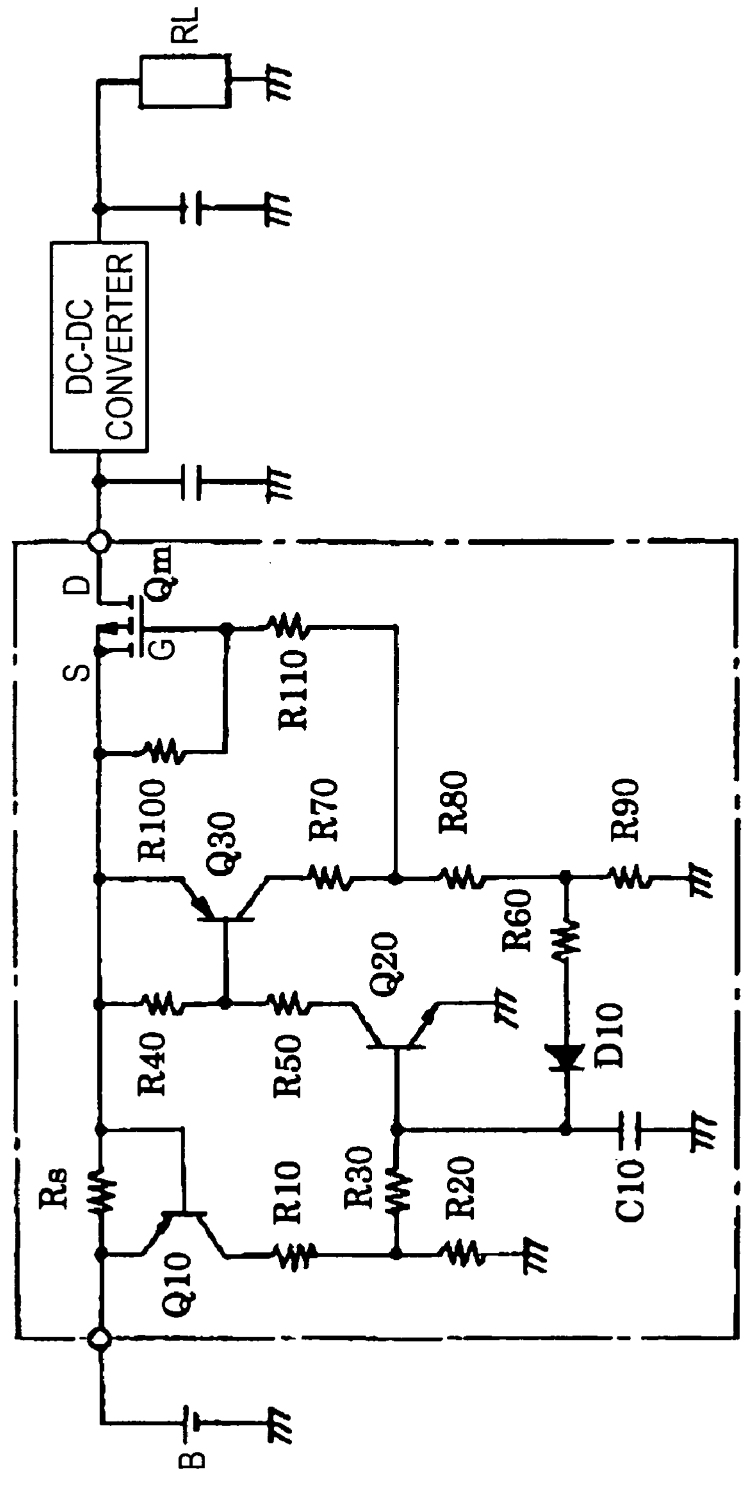
FIG. 1 is a view showing the configuration of an overcurrent protection circuit in the related art.
Figure 2:
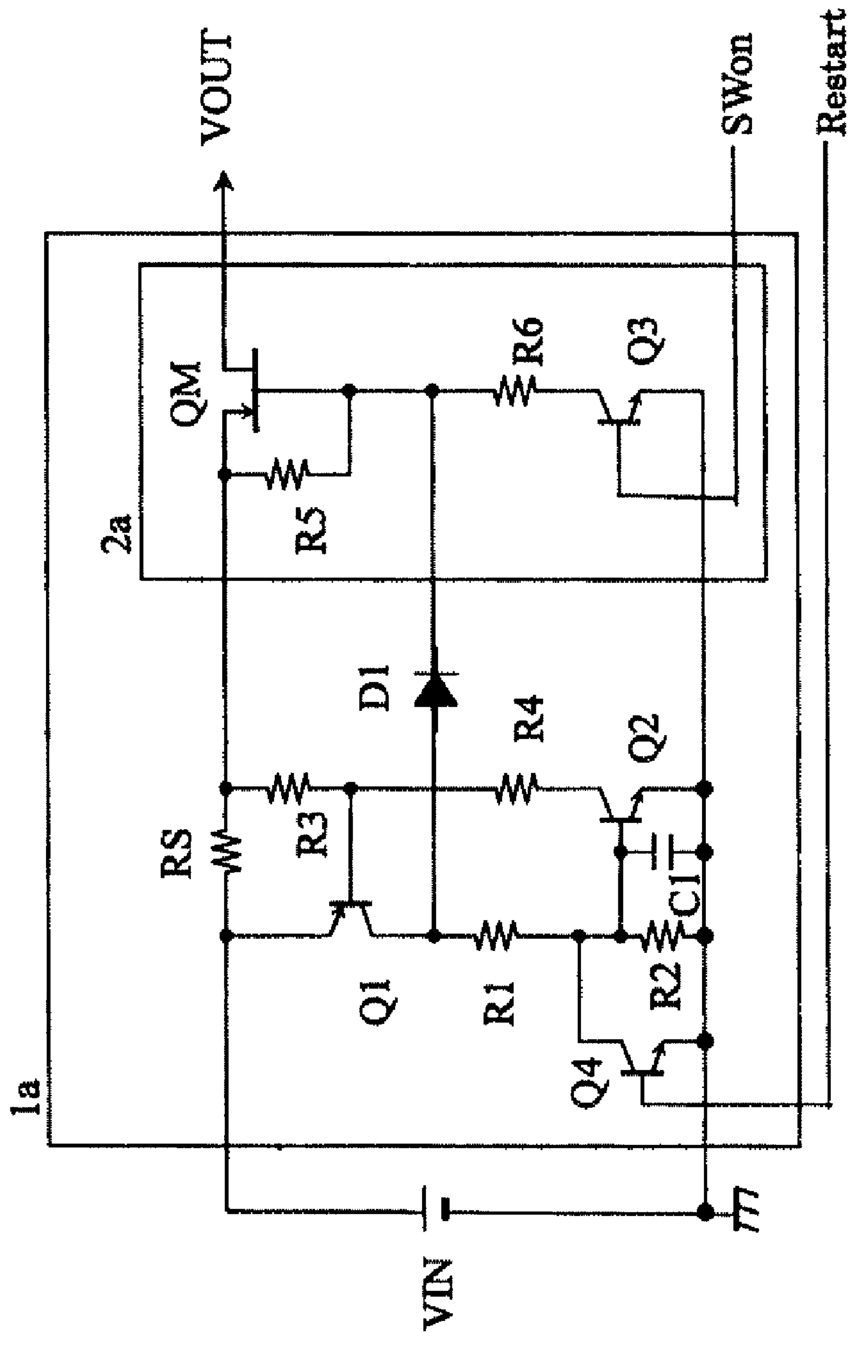
FIG. 2 is a view showing the configuration of an overcurrent protection circuit 1*a* according to a first embodiment of the present invention.

FIG. 2 is a view showing the configuration of an overcurrent protection circuit 1*a* according to a first embodiment of the invention. Between a power source VIN for supplying power and a load (not shown) connected to a destination of voltage output VOUT, a load current detection resistor RS and a main transistor QM which controls the supply of power to the load are connected in series to each other. Although the main transistor QM is formed as a P-channel MOS field effect transistor, for example, any element operating as a switch element may be used as the main transistor QM.

A first transistor Q1, a first resistor R1, and a second resistor R2 are connected in series between a ground point and a connection point of the power source VIN and the load current detection resistor RS. The first transistor Q1 is controlled to have one of a current flowing state where a current flows (hereinafter, referred to as "ON"), a restriction state where the amount of flowing current is restricted, and a cutoff state where a current is cut off (hereinafter, referred to as "OFF"), depending on a voltage drop occurring at both ends of the load current detection resistor RS corresponding to the load current.

A third resistor R3, a fourth resistor R4, and a second transistor Q2 are connected in series between the ground point and a connection point of the load current detection resistor RS and the main transistor QM. In addition, a fifth resistor R5 is connected between the connection point and a control end of the main transistor QM.

Between the control end of the main transistor QM and the ground point, a sixth resistor R6 and a third transistor Q3 are connected in series to each other.

A connection point between the first and second resistors R1 and R2 and a control end of the second transistor Q2 are connected to each other, and a capacitor C1 and a fourth transistor Q4 are connected in parallel to the second resistor R2.

A connection point between the first transistor Q1 and the first resistor R1 is connected to the input end of a first diode (rectifying element) D1, and the output end of the first diode D1 is connected to a connection point between the control end of the main transistor QM and the sixth resistor R6.

An SWon signal for turning on the main transistor QM is input to the control end of the third transistor Q3, and a Restart signal for restarting the overcurrent protection circuit 1*a* is input to the control end of the fourth transistor Q4.

In addition, the main transistor QM, the fifth and sixth resistors R5 and R6, and the third transistor Q3 form a switch circuit 2*a* for supplying power from the power source VIN to the load.

In addition, the transistors Q1 to Q4 are formed as NPN transistors or junction transistors, for example. However, any element operating as a switch element may be used for the transistors Q1 to Q4.

Figure 3:
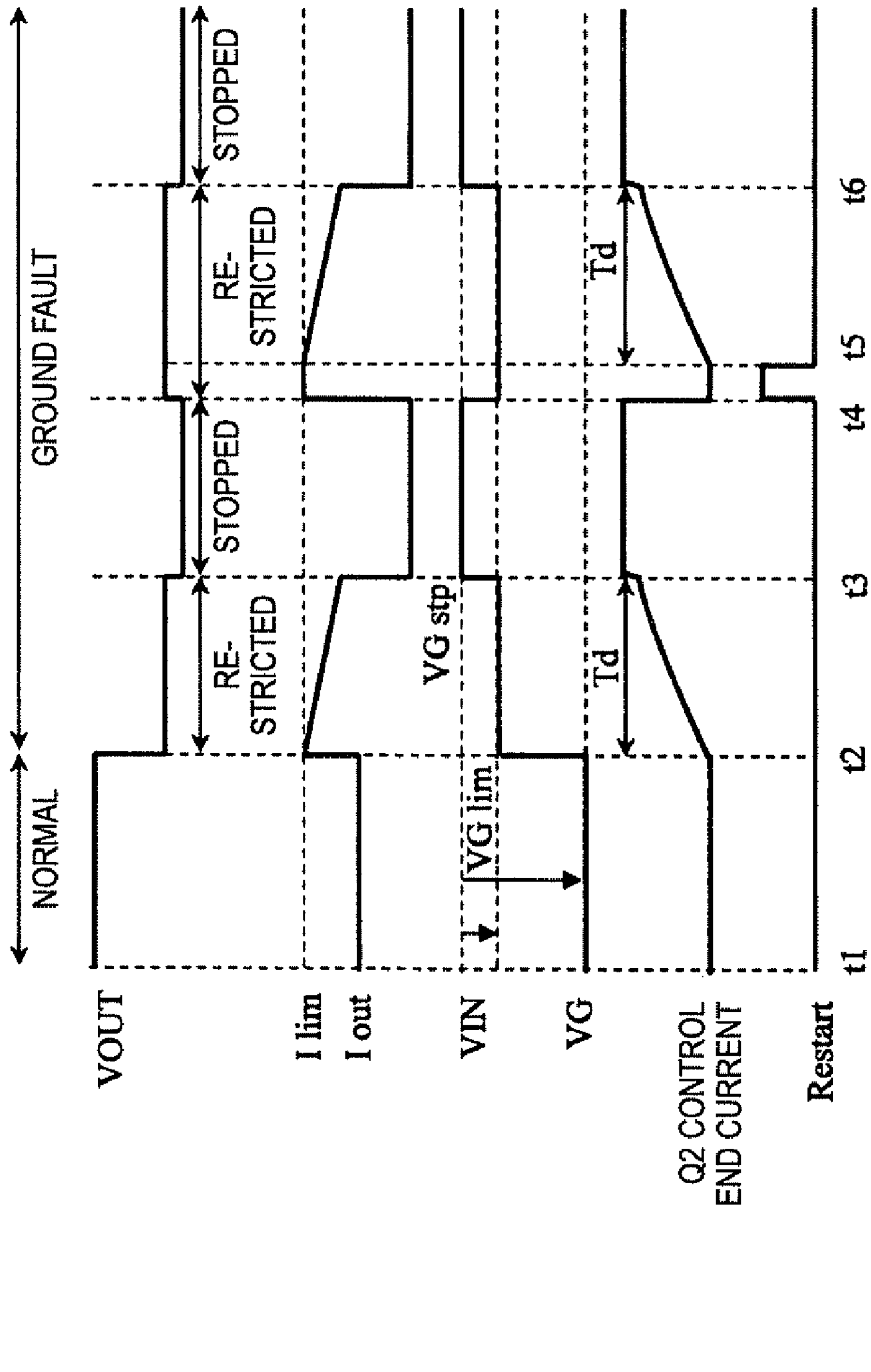
FIG. 3 is a timing chart illustrating an operation of the overcurrent protection circuit 1*a* according to the first embodiment of the present invention.

FIG. 3 is a timing chart illustrating an operation of the overcurrent protection circuit 1*a* according to the first embodiment. The horizontal axis indicates a time, and the vertical axis indicates a voltage value, a current value, and a signal in predetermined places of the overcurrent protection circuit 1*a* and the switch circuit 2*a*. VOUT is the value of a voltage applied to the load. Iout is the value of a current which flows between the input and output ends of the main transistor QM and is then output to the load, and Ilim indicates a predetermined current value of Iout, which will be described later. VG is an electric potential of the control end of the main transistor QM, and indicates how much the voltage has dropped from the electric potential of VIN. VGlim and VGstp indicate predetermined voltage values of VG, which will be described later. A Q2 control end current indicates the amount of current flowing through the control end of the transistor Q2. Restart indicates the value of a Restart signal.

In the switch circuit 2*a*, when the SWon signal is supplied, a bias is applied to the third transistor Q3 to turn on the third transistor Q3. Since the control end of the main transistor QM and the ground point are connected to each other and a voltage is applied from the power source VIN, a voltage drop occurs between the input and control ends of the main transistor QM. Then, the main transistor QM is turned on. Then, the output current Iout starts to flow to the load, resulting in the state of time t1.

Time t2 indicates a point of time at which the output current Iout has increased due to a ground fault that occurred in the load. When a result of a voltage drop in the load current detection resistor Rs reaches an overcurrent detection voltage set beforehand, the first transistor Q1 is turned on. Here, the output end of the first transistor Q1 and the first resistor R1 are connected to each other, and the connection point and the control end of the main transistor QM are connected to each other through the first diode D1. Accordingly, a voltage is applied to the control end of the main transistor QM through the turning ON of the first transistor Q1. The electric potential of the input end of the main transistor QM is higher than the electric potential of the control end by the voltage drop in the fifth resistor R5. For this reason, since the electric potential of the control end increases if the voltage is applied to the control end of the main transistor QM, the electric potential difference between the input and control ends is reduced. In this case, the electric potential of the control end of the main transistor QM is assumed to be VGlim. If the potential difference between the input and control ends of the main transistor QM is decreased, the channel becomes narrow. As a result, the amount of current flowing through the main transistor QM is reduced, and the output current Iout is restricted to the value of Ilim. The value which does not exceed the allowable amount of current of the load current detection resistor RS and the main transistor QM is given as the value of Ilim, which will be described later.

Thus, the main transistor QM functions as a restriction means for restricting the flow of current through the load. In addition, the main transistor QM, the first transistor Q1, the third resistor R3, and the first diode D1 form a restriction circuit including the restriction means for restricting the current flowing through the load.

If the first transistor Q1 is turned on, the current flowing through the first resistor R1 flows to the capacitor C1 to start charging the capacitor C1. When the capacitor C1 is sufficiently charged, a predetermined bias is applied to the second transistor Q2 to turn on the second transistor Q2.

In addition, a time Td until the voltage applied to the control end of the second transistor Q2 reaches a predetermined voltage is set according to the time constant based on the size of the first resistor R1 and the capacitance of the capacitor C1. The time is a time until the capacitor C1 is charged with a current flowing through the first resistor R1 and the voltage between both ends of the capacitor C1 reaches a voltage for turning on the second transistor Q2. By this Td, the second transistor Q2 is not turned on immediately and the main transistor QM does not stop the flow of current even if an overcurrent flows due to a ground fault. The overcurrent protection circuit 1*a* is configured to prevent a situation where an instantaneous overcurrent, which is caused by an inrush current at the start of operation or the input of noise from the outside, is erroneously detected as a ground fault and flowing of the load current is stopped.

Thus, the capacitor C1 functions as a delay means for delaying, by a specified delay time, a time until the flow of a load current is stopped after an overcurrent is detected. In addition, the capacitor C1 and the first resistor R1 form a delay circuit including the delay means.

Time T3 indicates a point of time at which the delay time Td has elapsed and the flow of current to the load is stopped after the overcurrent caused by a ground fault was generated. If the second transistor Q2 is turned on, the control end of the first transistor Q1 is connected to the ground point. As a result, a current of the control end increases. The second transistor Q2 functions as a transistor for ground. By the increase in the current of the control end, the current flowing through the first transistor Q1 increases. Then, the current flowing through the first diode D1 connected to the output end of the first transistor Q1 increases. By the current increase, the electric potential VG of the connection point between the control end of the main transistor QM and the sixth resistor R6 rises to reach VGstp. In addition, VGstp is the same as the electric potential of the input end of the main transistor QM and is given by expression to be described later.

Then, the potential difference between the input and control ends of the main transistor QM is eliminated to turn off the main transistor QM, which will be described later. By this change to OFF, flowing of the current to the load is stopped. As a result, the load current detection resistor RS and the main transistor QM connected between the power source VIN and the load are protected from an overcurrent.

Here, VGstp is given by the following expression (1). In addition, VCE(Q1) is a voltage between the control and output ends of the first transistor Q1, and VF(D1) is a voltage between both ends of the first diode D1.

$$VGstp=VCE(Q1)+VF(D1) \tag{1}$$

In addition, the value of VGlim is a value from 0 to VGstp, and is preferably set on the basis of the characteristics of the main transistor QM such that the current Ilim, which does not break down the load current detection resistor RS and the main transistor QM, is made to flow.

In the case where VGstp is set to VCE(Q1)+VF(D1), the potential difference between the input and control ends of the main transistor QM is eliminated when VGS, which is the voltage between both the ends, is 0[v]. VGS is given by the following expression. In addition, Ilim is VBE(Q1)/ROTATION SPEED.

$$VGS=VGstp-RS\times Ilim$$

From the expression (1), VGS=VCE(Q1)+VF(D1)−RS× Ilim is derived. From Ilim=VBE(Q1)/RS, the following expression (2) is derived.

$$VGS=VCE(Q1)+VF(D1)-VBE(Q1) \tag{2}$$

Here, assuming that the values of VF(D1) and VBE(Q1) are about 0.6[v] according to the general voltage drop characteristics of a diode, the following expression (3) is derived.

$$VGS=VCE(Q1) \tag{3}$$

Moreover, when a current sufficiently flows through the first transistor Q1, the value of VCE(Q1) can be approximated to 0[v] since a voltage drop between the input and output ends of the first transistor Q1 is also sufficiently small. Assuming that VCE(Q1) when a current sufficiently flows through the first transistor Q1 is VCEsat(Q1), VGS≅VCEsat(Q1) and VGS≅0 are derived from the expression (3). Accordingly, the voltage VGS between the control and input ends of the main transistor Qm becomes zero.

Thus, the main transistor QM functions as a stop means for stopping the flow of current to the load. In addition, the main transistor QM, the third and fourth resistors R3 and R4, and the second transistor Q2 form a stop circuit including the stop means for stopping the flow of current to the load.

Moreover, in a state where the current flowing is stopped by the main transistor QM, a bias is continuously applied to the first transistor Q1 through the third resistor R3 and to the second transistor Q2 through the first transistor Q1 and the first resistor R1. Accordingly, since both the transistors hold the ON state, a state where a potential difference between the input and control ends of the main transistor QM does not occur is continued. Then, the flow of current to the load is continuously stopped.

Thus, the first transistor Q1 functions as a holding means for holding the ON state of the second transistor Q2. In addition, the first transistor Q1 and the first to third resistors R1 to R3 form a holding circuit including the hold means for holding the ON state of the second transistor Q2.

Time t4 indicates a point of time at which the flow of current to the load is stopped and the Restart signal is output in a state where a ground fault is not eliminated. When the Restart signal is output, a bias is applied to the fourth transistor Q4 to turn on the fourth transistor Q4. Then, a connected point between the first resistor R1 and the capacitor C1 is connected to the ground point. As a result, the capacitor C1 is discharged to turn off the second transistor Q2. That is, a Restart signal is a signal for eliminating the ON state of the second transistor Q2 and the state of the main transistor QM where the flow of current is stopped. However, even if the second transistor Q2 is turned off, the first transistor Q1 is not turned off because a fixed bias is applied by a voltage drop, which occurs at both ends of the load current detection resistor RS, if the a ground fault is not eliminated. Accordingly, the electric potential of the control end of the main transistor QM changes to VGlim as described above, and the output current Iout is restricted to the value of Ilim.

In addition, when the ground fault is eliminated at time t4, the output current Iout has a normal current value which is the same as that at time t1.

In addition, the Restart signal is output by a microcomputer (not shown) when a predetermined time is elapsed after the flow of current to the load is stopped, for example. In addition, when the overcurrent protection circuit 1*a* is mounted in a vehicle, the Restart signal may be output at the start of an in-vehicle electronic apparatus or a motor.

Time t5 indicates a point of time at which the output of the Restart signal has been stopped. If the output of the Restart is stopped, a bias is not applied to the fourth transistor Q4. As a result, the fourth transistor Q4 is turned off. Then, the current flowing through the first resistor R1 flows to the capacitor C1 to start charging the capacitor C1. Then, as described above, the flow of an output current is restricted during the delay time Td, and the current flowing is stopped at time t6 after the delay time Td has elapsed.

In addition, immediately after the input of the SWon signal, the output current Tout flows as an inrush current to a capacitor (not shown) provided in the load. The inrush current is an excessive current for the load current detection resistor RS and the main transistor QM. The inrush current may break down both the load current detection resistor RS and the main transistor QM and is also a current necessary for starting the load. In the overcurrent protection circuit 1*a* of the invention, when an overcurrent caused by an inrush current is detected, the first transistor Q1 is turned on similar to the operation at time t2 described above. Then, a voltage is applied to the control end of the main transistor QM and the electric potential of the control end changes to VGlim. As a result, the main transistor QM restricts the flow of current to the load. In addition, the overcurrent protection circuit 1*a* of the invention can protect the load current detection resistor RS and the main transistor QM, which are connected between the power source VIN and the load, from an overcurrent caused by an inrush current and does not stop the supply of a current to the load. As a result, it is possible to supply a fixed amount of current necessary for starting the load.

Second Embodiment

Figure 4:
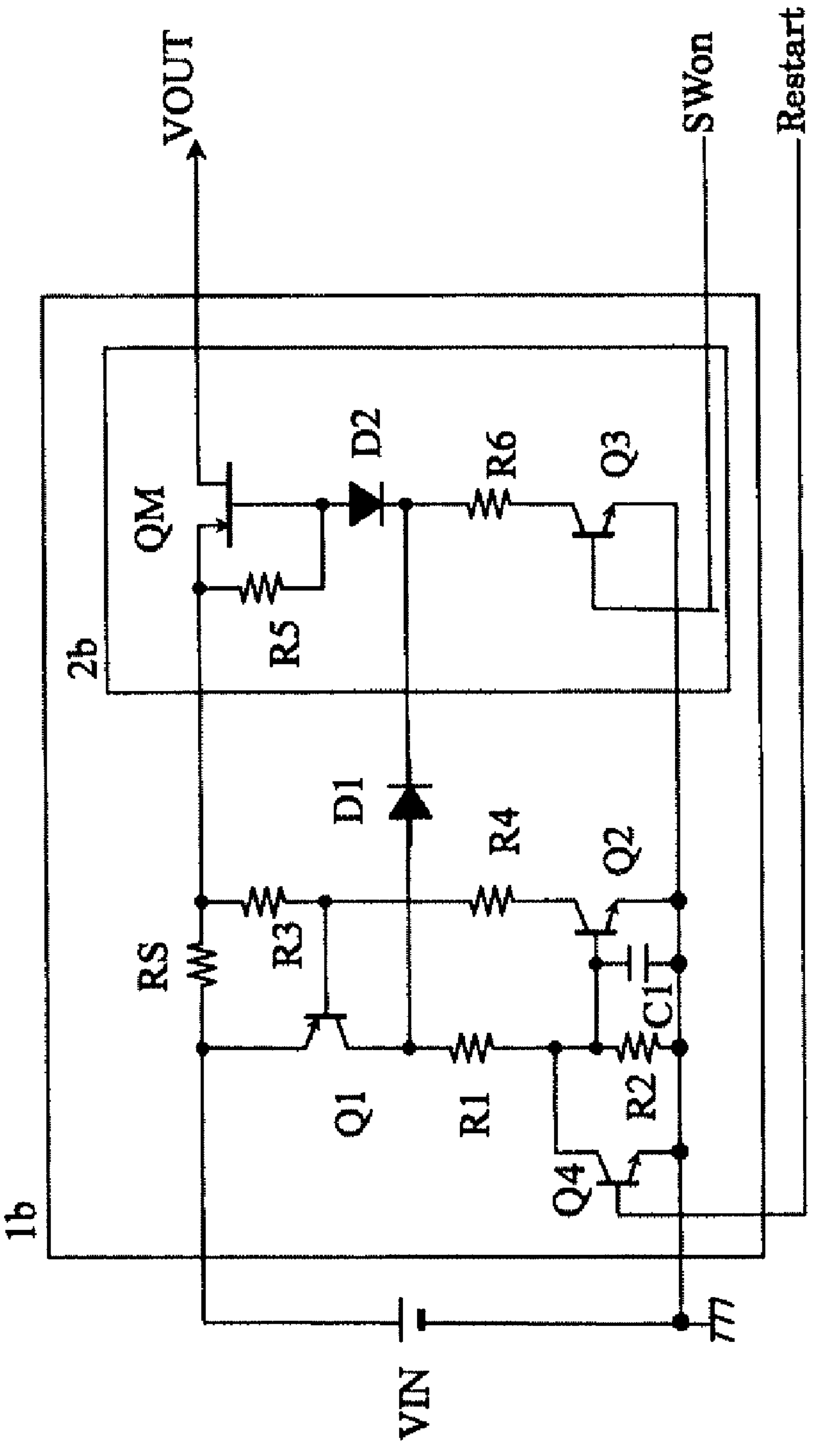
FIG. 4 is a view showing the configuration of an overcurrent protection circuit 1*b* according to a second embodiment of the present invention.

FIG. 4 is a view showing the configuration of an overcurrent protection circuit 1*b* according to a second embodiment of the invention.

The overcurrent protection circuit 1*b* is a circuit obtained by adding a second diode D2 to the switch circuit 2*a* in the overcurrent protection circuit 1*a* shown in FIG. 2. The second diode D2 is provided in a switch circuit 2*b*. In addition, the same components as those of the overcurrent protection circuit 1*a* shown in FIG. 2 are denoted by the same reference numerals, and an explanation thereof will be omitted.

The overcurrent protection circuit 1*a* shown in FIG. 2 turns off the main transistor QM by increasing the electric potential VG of the control end of the main transistor QM to eliminate the potential difference between the input and control ends of the main transistor QM. This control is performed on the assumption that VBE(Q1)=VF(D1) is satisfied on the basis of the characteristics of a diode.

However, since the first transistor Q1 and the first diode D1 are influenced by temperature due to the characteristics of a semiconductor, the value of a flowing current or an applied voltage is easy to change. By such a temperature change, the case also occurs in which the value of VBE(Q1) becomes larger than VF(D1). In this case, the above expression (2) becomes as follows.

$$VGS=VCE(Q1)+VF(D1)-VBE(Q1)$$

$$VGS>0$$

That is, since VGS, becomes a larger value than 0, the potential difference between the input and control ends of the main transistor QM is not eliminated. In this case, since the main transistor QM is not turned off, the flow of current to the load is not stopped. This causes a problem that an unnecessary current is continuously output.

Therefore, the overcurrent protection circuit 1*b* is configured to include the second diode D2 in order to solve the problem. An input end of the second diode D2 is connected to a connection point between the control end of the main transistor QM and the fifth resistor R5, and an output end of the second diode D2 is connected to an output end of the first diode D1.

Due to the characteristics of a diode, the second diode D2 causes a predetermined voltage drop. Accordingly, the voltage between the input and control ends of the main transistor QM, which are connected in series to each other, is reduced. Then, since VGS becomes a value closer to 0, a channel becomes narrower. As a result, the amount of current flowing through the main transistor QM is reduced.

Thus, since the overcurrent protection circuit 1*b* reduces the voltage value even if the voltage between the input and control ends of the main transistor QM is not 0 due to the temperature change, it is possible to reduce the amount of current flowing through the main transistor QM. As a result, it is possible to reduce the output of an unnecessary current.

In addition, the second diode D2 may be a resistive element or may be an element which functions to reduce the voltage between the input and control ends of the main transistor QM.

Moreover, although the overcurrent protection circuit 1*b* is a circuit obtained by adding the second diode D2 to the overcurrent protection circuit 1*a* shown in FIG. 2, the second diode D2 may be added not only to the overcurrent protection circuit 1*a* but also to overcurrent protection circuits according to other embodiments of the invention shown below. In this case, the overcurrent protection circuits in which the second diode D2 is added have the same operations and effects as those described above.

Third Embodiment

Figure 5:
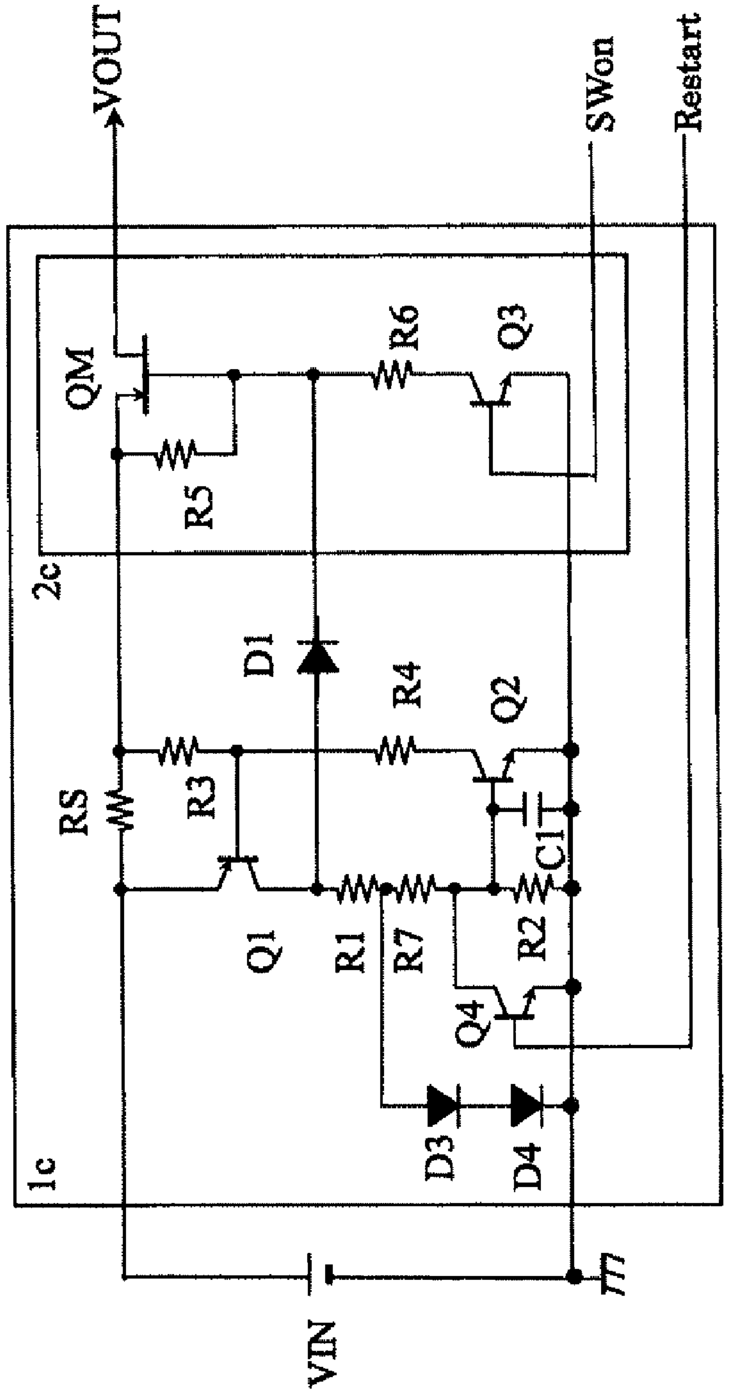
FIG. 5 is a view showing the configuration of an overcurrent protection circuit 1*c* according to a third embodiment of the present invention.

FIG. 5 is a view showing the configuration of an overcurrent protection circuit according to a third embodiment of the invention.

An overcurrent protection circuit 1*c* is a circuit obtained by adding third and fourth diodes D3 and D4 and a seventh resistor R7 to the overcurrent protection circuit 1*a* shown in FIG. 2. In addition, the same components as those of the overcurrent protection circuit 1*a* shown in FIG. 2 are denoted by the same reference numerals, and an explanation thereof will be omitted.

Since the voltage output from the power source VIN is a voltage which has not passed through a regulator, the voltage is easy to fluctuate. If the voltage of VIN is reduced, the charging current flowing to the capacitor C1 is also reduced. Accordingly, the delay time is extended. As a result, since the time for which an overcurrent flows through the load current detection resistor RS or the main transistor QM is also extended, a problem occurs in which the possibility that both the elements will break down increases.

Therefore, the overcurrent protection circuit 1*c* is configured to include the third and fourth diodes D3 and D4 and the seventh resistor R7 in order to solve the problem. One end of the seventh resistor R7 is connected to the first resistor R1, and the other end is connected to a connection point between the second resistor R2 and the capacitor C1. An input end of the third diode D3 is connected to a connection point between the first resistor R1 and the seventh resistor R7, and an output end of the third diode D3 is connected to an input end of the fourth diode D4. An input end of the fourth diode D4 is connected to the output end of the third diode D3, and an output end of the fourth diode D4 is connected to the ground point.

The third and fourth diodes D3 and D4 function as so-called clamp elements which cause a constant voltage drop by the operation of diodes. In this circuit, the sum of the voltage drop caused by the third and fourth diodes D3 and D4 is about 1.2[v]. This is almost constant irrespective of a fluctuation in the voltage output from the power source VIN. Since the capacitor C1 and the seventh resistor R7 are connected in parallel to the third and fourth diodes D3 and D4, the sum of voltage drop caused in the capacitor C1 and the seventh resistor R7 is constant and is about 1.2[v]. Since this voltage drop is based on the operation of a diode, a voltage is stably applied to the capacitor C1 and the seventh resistor R7 irrespective of the fluctuation in the voltage output from the power source VIN. As a result, even if the voltage of VIN is reduced, the charging current flowing to the capacitor C1 is constant and the above-described delay time is not extended accordingly.

Thus, since the time for which an overcurrent flows through the load current detection resistor RS or the main transistor QM is not extended even if there is a fluctuation in the output of the power source VIN, the overcurrent protection circuit 1*c* prevents an increase in the possibility that both the elements will break down. Similarly, also in the case where the output current of the first transistor Q1 fluctuates due to the temperature change, a voltage is stably applied to the capacitor C1 and the seventh resistor R7. Accordingly, the charging current flowing through the capacitor C1 can be made constant.

In addition, the third and fourth diodes D3 and D4 are not limited to diodes, and any element which causes a fixed voltage drop irrespective of fluctuation in the output of the power source VIN may also be used for the third and fourth diodes D3 and D4.

Moreover, although the overcurrent protection circuit 1*c* is a circuit obtained by adding the third and fourth diodes D3 and D4 and the seventh resistor R7 to the overcurrent protection circuit 1*a* shown in FIG. 2, these elements may be added not only to the overcurrent protection circuit 1*a* but also to overcurrent protection circuits according to other embodiments of the invention shown below. In this case, the overcurrent protection circuits in which the third and fourth diodes D3 and D4 and the seventh resistor R7 are added have the same operations and effects as those described above.

Fourth Embodiment

Figure 6:
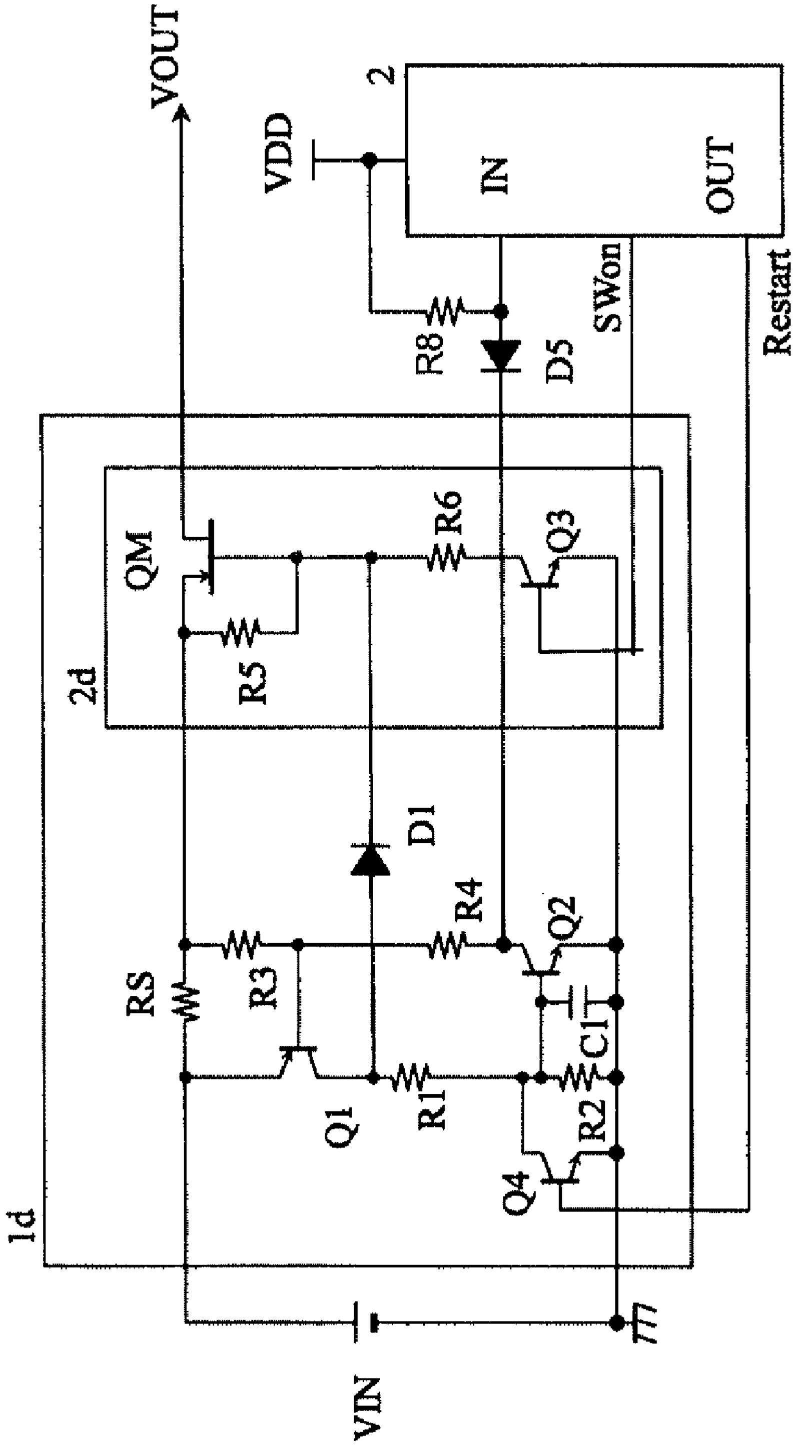
FIG. 6 is a view showing the configuration of an overcurrent protection circuit 1*d* according to a fourth embodiment of the present invention.

FIG. 6 is a view showing the configuration of an overcurrent protection circuit according to a fourth embodiment of the invention.

The overcurrent protection circuit 1*d* is a circuit obtained by adding a microcomputer 2, an eighth resistor R8, and a fifth diode D5 to the overcurrent protection circuit 1*a* shown in FIG. 2, and the microcomputer 2 serves as a circuit that outputs the SWon signal and the Restart signal. In addition, the same components as those of the overcurrent protection circuit 1*a* shown in FIG. 2 are denoted by the same reference numerals, and an explanation thereof will be omitted.

In the overcurrent protection circuit 1*a* shown in FIG. 2, the Restart signal is output from the microcomputer when a predetermined time is elapsed after flow of current to a load is stopped. However, the flow of current to the load may be stopped not only by the occurrence of an overcurrent caused by a ground fault but also according to the operational status of the load. The Restart signal is a signal for eliminating a current flowing stop state, which is realized by an overcurrent protection circuit, when the flow of current to the load is stopped by the occurrence of an overcurrent. For this reason, in the overcurrent protection circuit 1*a*, it becomes a problem how to detect the stopping of flow of current to the load, which is performed due to the occurrence of an overcurrent, in order to output the Restart signal.

Therefore, the overcurrent protection circuit 1*d* is configured to include the microcomputer 2, the eighth resistor R8, and the fifth diode D5 in order to solve the problem. The microcomputer 2 connected to the overcurrent protection circuit 1*d* outputs an SWon signal to the control end of the third transistor Q3 and also outputs a Restart signal to the control end of the fourth transistor Q4. In addition, the microcomputer 2 is connected to the input end of the fifth diode D5, and the output end of the fifth diode D5 is connected to a connection point between the fourth resistor R4 and the input end of the second transistor Q2. Power from the power source VDD is supplied to the microcomputer 2. One end of the eighth resistor R8 is connected to the power source VDD, and the other end is connected to a connection point between the input end of the fifth diode D5 and the microcomputer 2.

A predetermined voltage is applied to the microcomputer 2 through the eighth resistor R8 connected to the power source VDD. The value of the voltage is set on the basis of the value of the power source VDD and the value of the eighth resistor R8, and is a fixed value while power is being supplied stably from the power source VDD. That is, a high-level signal is input from the power source VDD to the microcomputer 2. If an overcurrent is detected by the load current detection resistor RS, the second transistor Q2 is turned on in the delay time described above. Then, a connection point between the eighth resistor R8 and an input terminal of the microcomputer 2 is also connected to the ground point. If the connection point between the eighth resistor R8 and the input terminal is connected to the ground point, the current flowing through the eighth resistor R8 flows to the ground point. As a result, the voltage applied to the microcomputer 2 abruptly drops. That is, a low-level signal is input to the microcomputer 2. The microcomputer 2 can detect the stopping of flow of current to the load, which is performed due to the occurrence of an overcurrent, by detecting the change from the high level to the low level of the voltage. The microcomputer 2 outputs the Restart signal at a predetermined timing after detecting the stopping of flow of current.

Thus, since the overcurrent protection circuit 1*d* is connected to the microcomputer 2, it is possible to detect the stopping of flow of current to the load, which is performed due to the occurrence of an overcurrent. As a result, after the flow of current to the load is stopped, the Restart signal can be output from the microcomputer 2.

Fifth Embodiment

Figure 7:
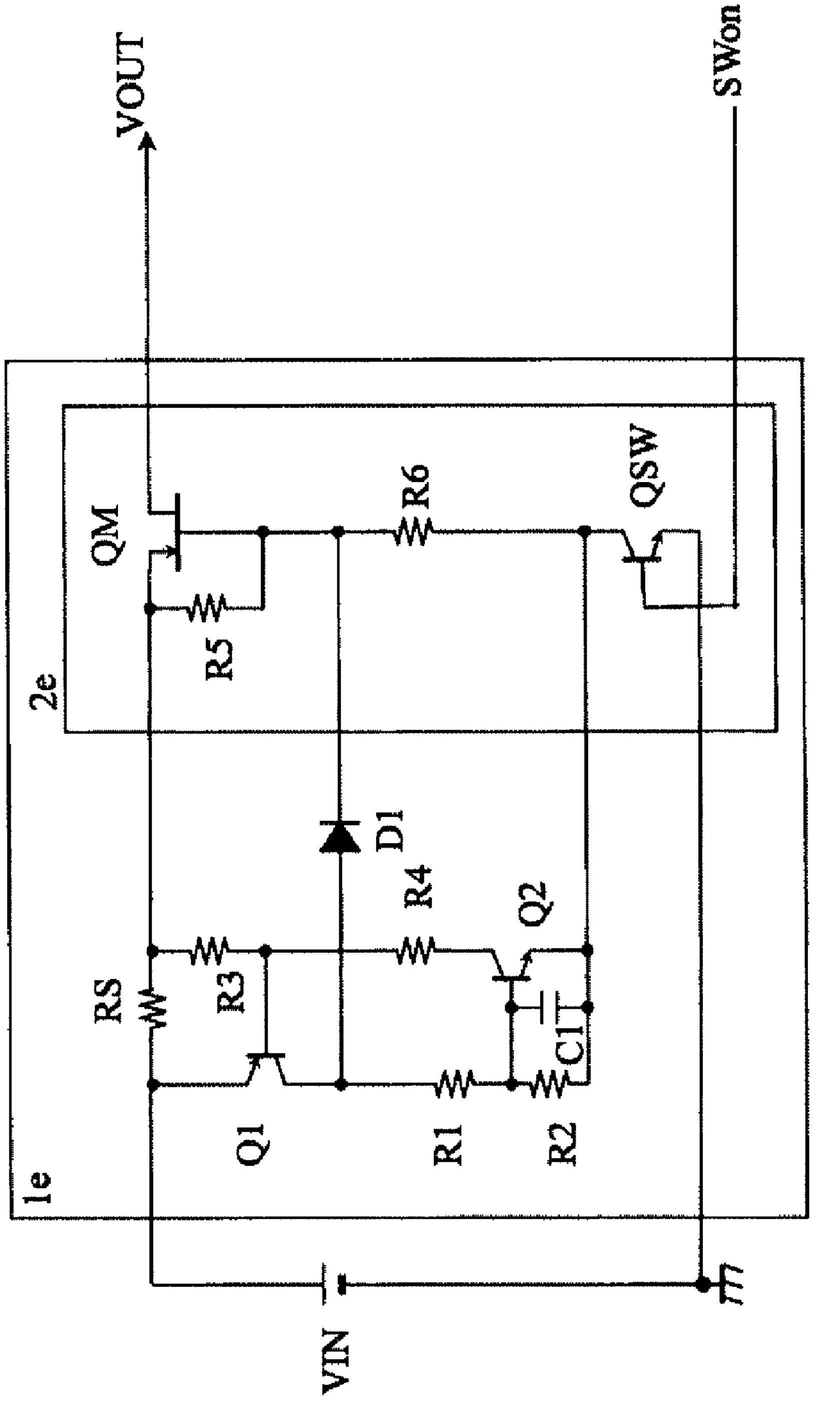
FIG. 7 is a view showing the configuration of an overcurrent protection circuit 1*e* according to a fifth embodiment of the present invention.

FIG. 7 is a view showing the configuration of an overcurrent protection circuit according to a fifth embodiment of the invention.

An overcurrent protection circuit 1*e* is a circuit in which the fourth transistor Q4 is removed from the overcurrent protection circuit 1*a* shown in FIG. 2. In addition, the same components as those of the overcurrent protection circuit 1*a* shown in FIG. 2 are denoted by the same reference numerals, and an explanation thereof will be omitted.

In the overcurrent protection circuit 1*a* shown in FIG. 2, an output circuit of the SWon signal and an output circuit of the Restart signal are separately provided. In the overcurrent protection circuit 1*e*, both the output circuits are formed as a single circuit in order to reduce the cost of the overcurrent protection circuit.

In the overcurrent protection circuit 1*e*, an output end of the second transistor Q2, a negative end of the capacitor C1, and a ground-side end of the second resistor R2 are connected to an input end of a switch transistor QSW instead of being connected to the ground point in the circuit 1*a*. Moreover, in the overcurrent protection circuit 1*e*, the output circuit of the Restart signal including the fourth transistor Q4 is removed. The main transistor QM, the fifth and sixth resistors R5 and R6, and the switch transistor QSW form a switch circuit 2*e*.

If the SWon signal is continuously input to the control end of the switch transistor QSW, a bias is applied to the switch transistor QSW. Then, the switch transistor QSW is turned on. When the switch transistor QSW is turned on, the control end of the main transistor QM and the ground point are connected to each other and a voltage is applied from the power source VIN. Then, a voltage drop occurs between the input and control ends of the main transistor QM, and the main transistor QM is turned on. As a result, the flow of the output current Iout is started. That is, the input of a signal to the control end of the switch transistor QSW causes the same operation as the input of the SWon signal in the overcurrent protection circuit 1*a*.

When an overcurrent is detected by the load current detection resistor RS, the second transistor Q2 is turned on through the procedures described above. Then, the connection point between the load current detection resistor RS and the main transistor QM is connected to the ground point through the switch transistor QSW. Accordingly, since a current does not flow through the input end of the main transistor QM, the main transistor QM is turned off to stop the flow of current. Since the main transistor QM maintains the OFF state while the switch transistor QSW is ON, the flow of current is continuously stopped.

If the input of a signal to the control end of the switch transistor QSW is stopped, the overcurrent protection circuit 1*e* is disconnected from the ground point and a current does not flow. Then, the first transistor Q1 is turned off and the capacitor C1 is discharged. The second transistor Q2 is turned off by discharge of the capacitor C1, and the connection point between the load current detection resistor RS and the main transistor QM is disconnected from the ground point. Then, a signal is input again to the input end of the switch transistor QSW. As a result, the main transistor QM is turned on. That is, the stopping of a signal to the control end of the switch transistor QSW causes the same operation as the input of the Restart signal in the overcurrent protection circuit 1*a*.

Thus, in the overcurrent protection circuit 1*e*, the signal input to the control end of the switch transistor QSW serves as both the SWon signal and the Restart signal. In this case, since both the output circuits can be formed as a single circuit in the overcurrent protection circuit 1*e*, the cost of the overcurrent protection circuit can be reduced.

Sixth Embodiment

Figure 8:
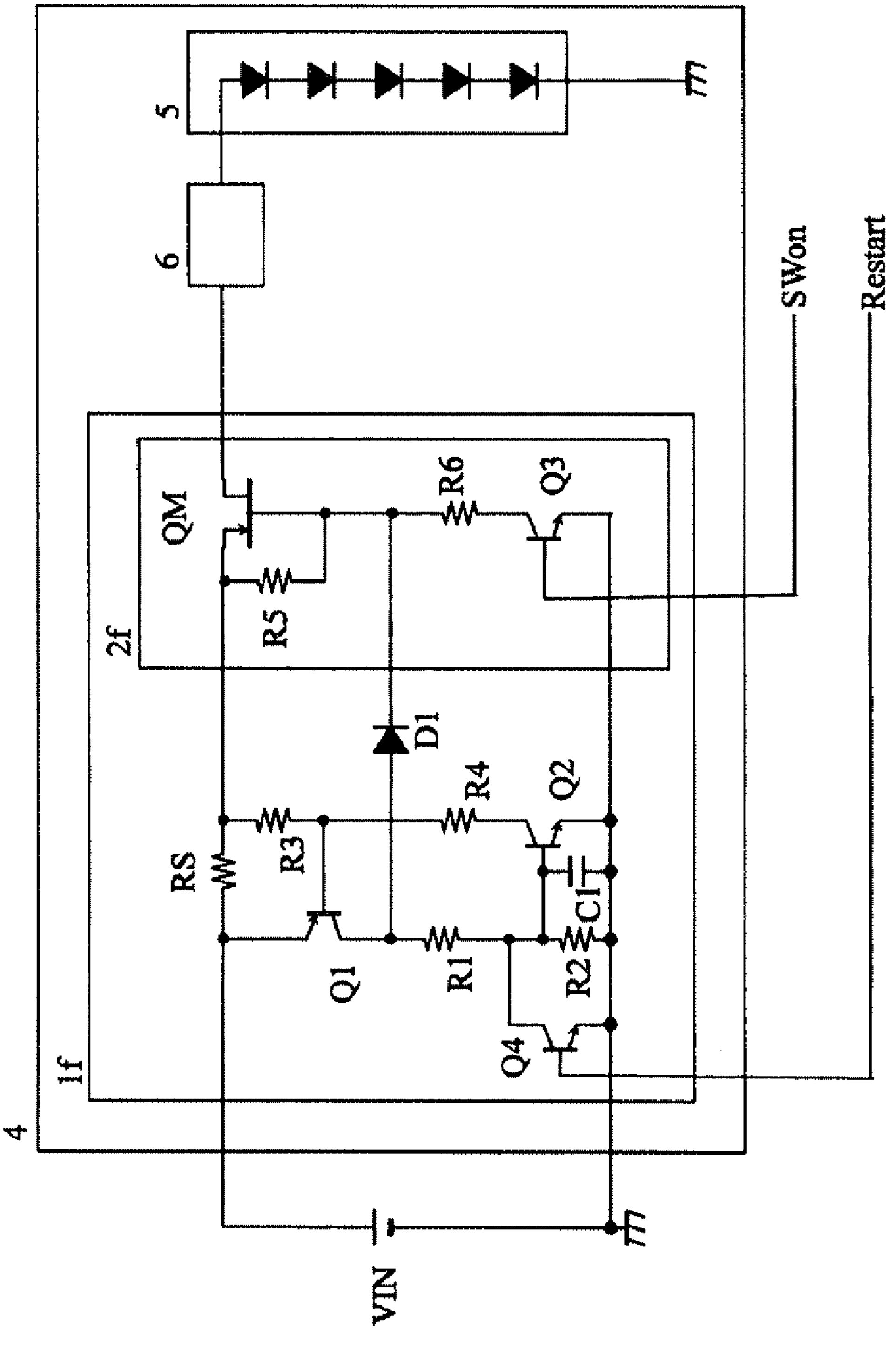
FIG. 8 is a view showing the configuration of an in-vehicle display device 4 according to a sixth embodiment of the present invention.

FIG. 8 is a view showing the configuration of an in-vehicle display device 4 according to a sixth embodiment of the invention.

The in-vehicle display device 4 is a device including the overcurrent protection circuit 1*a* shown in FIG. 2. An overcurrent protection circuit 1*f* shown in FIG. 8 is equivalent to the overcurrent protection circuit 1*a* shown in FIG. 2. In addition, the same components as those of the overcurrent protection circuit 1*a* shown in FIG. 2 are denoted by the same reference numerals, and an explanation thereof will be omitted.

The in-vehicle display device 4 includes an LED driver 6 which controls a light-emitting LED 5, and displays predetermined information, such as a map, for a person in the vehicle using the light-emitting LED 5 as a light source. Since the in-vehicle display device 4 is provided in the vehicle, vibration caused by traveling is continuously given to the in-vehicle display device 4 while the vehicle is traveling. This vibration causes a problem in the wiring lines of the inside circuit, and this becomes a cause of ground faults. In addition, since the in-vehicle display device 4 uses the plurality of light-emitting LEDs 5 as a light source, a plurality of ventilation holes for discharging the heat generated by light emission is provided. Dirt which has entered into the device through the ventilation holes comes in contact with the circuit of the LED driver 6 or the light-emitting LED 5 and causes a ground fault.

Therefore, the overcurrent protection circuit 1*f* is connected to a circuit which supplies power to the in-vehicle display device 4. The main transistor QM and the load current detection resistor RS are connected between the LED driver 6 and the power source VIN, and power is supplied to the light-emitting LED 5. When a ground fault occurs in the LED driver 6, the overcurrent protection circuit 1*f* operates and as a result, the main transistor QM and the load current detection resistor RS are protected from the overcurrent through the procedures described above.

Thus, since ground faults easily occur due to vibration or the like in the in-vehicle display device 4, it is useful to provide the overcurrent protection circuit 1 if in the in-vehicle display device 4.

In addition, the in-vehicle display device is not limited to a display device, and an in-vehicle audio apparatus, an in-vehicle navigation apparatus, or an in-vehicle electronic apparatus may also be used. Moreover, it may be used for home application or moving vehicles without being limited to vehicles.

What is claimed is:

1. An overcurrent protection circuit comprising:

an overcurrent detecting element which is connected between a power source and a load and which detects an overcurrent flowing through the load;

a main switch element which is connected between the load and the overcurrent detecting element and which controls flow of current to the load according to a voltage applied between a control end and an input end of the main switch element, wherein the main switch element stops the flow of current to the load when a predetermined time is elapsed after the overcurrent detecting element detects the overcurrent flowing through the load; and a first switch element which has an output end connected to the control end of the main switch element and an input end connected between the power source and the overcurrent detecting element through which current flows when the overcurrent detecting element detects the overcurrent flowing through the load.

2. The overcurrent protection circuit as set forth in claim 1, further comprising a rectifying element provided in a connection line, in which the control end of the main switch element and the output end of the first switch element are connected to each other, such that an output end of the rectifying element is located toward the control end of the main switch element.

3. An in-vehicle display device comprising the overcurrent protection circuit as set forth in claim 1, wherein the load is the in-vehicle display device.

4. An overcurrent protection circuit comprising:

an overcurrent detecting element which is connected between a power source and a load and which detects an overcurrent flowing through the load;

a main switch element which is connected between the load and the overcurrent detecting element and which controls flow of current to the load according to a voltage applied between a control end and an input end of the main switch element, wherein the main switch element stops the flow of current to the load when a predetermined time is elapsed after the overcurrent detecting element detects the overcurrent flowing through the load;

a first switch element which has an output end connected to the control end of the main switch element and to which a current flows when the overcurrent detecting element detects the overcurrent flowing through the load;

a capacitive element connected between the first switch element and a ground point;

a second switch element which has a control end connected to the capacitive element;

a third switch element which is connected in parallel to the capacitive element and which has an output end connected to the ground point; and an output circuit which outputs a signal to an control end of the third switch element when it is detected that the second switch element is turned on, wherein when the output circuit outputs the signal, the capacitive element discharges a current to the ground point to turn off the third switch element.

5. The overcurrent protection circuit as set forth in claim 4, further comprising a ground switch element which has an input end, which is connected in series to the control end of the main switch element, an output end of the second switch element, and one end of the capacitive element, and an output end connected to the ground point, wherein when a signal is input to the control end, the ground switch element is turned on to be electrically connected to the ground point.

6. The overcurrent protection circuit as set forth in claim 4, wherein a clamp element is connected in parallel to the capacitive element.

* * * * *